US012151245B2

(12) United States Patent
Paulovich et al.

(10) Patent No.: US 12,151,245 B2
(45) Date of Patent: Nov. 26, 2024

(54) BIO-SPECIMEN REFRIGERATION SYSTEM

(71) Applicant: Fred Hutchinson Cancer Research Center, Seattle, WA (US)

(72) Inventors: Amanda G. Paulovich, Seattle, WA (US); Richard Ivey, Federal Way, WA (US); Jacob Kennedy, Seattle, WA (US); Travis Lorentzen, Bothell, WA (US); Amanda Woodcock, Seattle, WA (US); Scott C. Thielman, Seattle, WA (US); Elijah E. Hooper, Seattle, WA (US)

(73) Assignee: Fred Hutchinson Cancer Research Center, Seattle, WA (US)

( * ) Notice: Subject to any disclaimer, the term of this patent is extended or adjusted under 35 U.S.C. 154(b) by 376 days.

(21) Appl. No.: 17/531,260

(22) Filed: Nov. 19, 2021

(65) Prior Publication Data

US 2022/0161263 A1 May 26, 2022

Related U.S. Application Data

(60) Provisional application No. 63/116,509, filed on Nov. 20, 2020.

(51) Int. Cl.
*B60L 7/00* (2006.01)
*B01L 7/00* (2006.01)

(52) U.S. Cl.
CPC ............. *B01L 7/00* (2013.01); *B01L 2200/04* (2013.01); *B01L 2200/0689* (2013.01); *B01L 2300/1894* (2013.01)

(58) Field of Classification Search
CPC .......... B01L 7/00; B01L 7/50; B01L 2200/04; B01L 2200/0689; B01L 2300/1894
See application file for complete search history.

(56) References Cited

U.S. PATENT DOCUMENTS

| | | | | | |
|---|---|---|---|---|---|
| 1,059,845 | A * | 4/1913 | Delahunty | D21C 9/10 | 68/184 |
| 4,336,691 | A * | 6/1982 | Burstein | G01N 1/42 | 62/51.1 |
| 4,489,569 | A * | 12/1984 | Sitte | F25D 3/10 | 62/51.1 |
| 4,551,992 | A * | 11/1985 | Sitte | G01N 1/42 | 62/51.1 |
| 4,578,963 | A * | 4/1986 | Sitte | G01N 1/42 | 62/51.1 |
| 4,580,416 | A * | 4/1986 | Sitte | G01N 1/42 | 62/51.1 |

(Continued)

*Primary Examiner* — Marc E Norman
(74) *Attorney, Agent, or Firm* — CHRISTENSEN O'CONNOR JOHNSON KINDNESS PLLC

(57) ABSTRACT

Devices and methods for bio-specimen refrigeration are provided. In an embodiment, the bio-specimen refrigeration devices of the present disclosure include a housing having a lid and a base portion, wherein the lid is selectively moveable between an open position and a closed position; a coolant cartridge chamber disposed in the housing and configured to fluidically couple with a coolant cartridge disposed in the coolant cartridge chamber; and a cooling chamber disposed in the housing and configured to receive a fluid coolant from the coolant cartridge, wherein in the closed position, the lid seals the cooling chamber.

14 Claims, 7 Drawing Sheets

(56) References Cited

U.S. PATENT DOCUMENTS

| | | | | | |
|---|---|---|---|---|---|
| 4,723,420 | A * | 2/1988 | Sitte | F25D 3/10 | 62/51.1 |
| 5,845,499 | A * | 12/1998 | Montesanto | B65D 81/3876 | 62/294 |
| 6,354,104 | B1 * | 3/2002 | Feagin | A61B 10/0096 | 70/68 |
| 2014/0157798 | A1 * | 6/2014 | Jimenez-Rios | A01N 1/0268 | 62/62 |
| 2016/0135447 | A1 * | 5/2016 | Visinoni | A01N 1/0257 | 435/307.1 |
| 2017/0320054 | A1 * | 11/2017 | Crum | B01L 9/06 | |
| 2019/0047756 | A1 * | 2/2019 | Brandenstein | A61J 1/1425 | |

* cited by examiner

BIO-SPECIMEN REFRIGERATION SYSTEM

CROSS-REFERENCE TO RELATED APPLICATIONS

This application claims the benefit under 35 U.S.C. 119 to U.S. Provisional Application No. 63/116,509, filed Nov. 20, 2020, the entirety of which is incorporated by reference for all purposes.

GOVERNMENT LICENSE RIGHTS

This invention was made with government support under CA225507 awarded by the National Institutes of Health. The government has certain rights in the invention.

BACKGROUND

Certain biological specimens, such as the cancer phosphoproteome, are highly susceptible to preanalytical variables (PAV) such as ischemic time prior to chemical fixation or flash freezing. Thus collecting and processing biological samples using operating protocols that minimize PAV can improve sample integrity.

For extraction-based methods (e.g., mass spectrometry, ELISA, Western blotting), the current gold standard is to flash freeze tumor samples in liquid nitrogen, followed by preparation of protein lysates in denaturing conditions in the presence of kinase/phosphatase inhibitor cocktails. However, a major limitation is that in many clinical settings liquid nitrogen is not readily available, and neither the personnel nor the infrastructure are generally available to rapidly process the tumor samples. As a result, biological samples are often subjected to prolonged ischemia and/or chemical fixatives, altering the phosphoproteome, and thereby compromising the bio-specimen's integrity such that it may no longer reflect the true in vivo state of the tumor.

There is need for a portable, single-use device that can be stored at room temperature and then activated at point of care, e.g., a hospital or surgical suite, to rapidly freeze bio-specimens.

BRIEF DESCRIPTION OF THE SEVERAL VIEWS OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
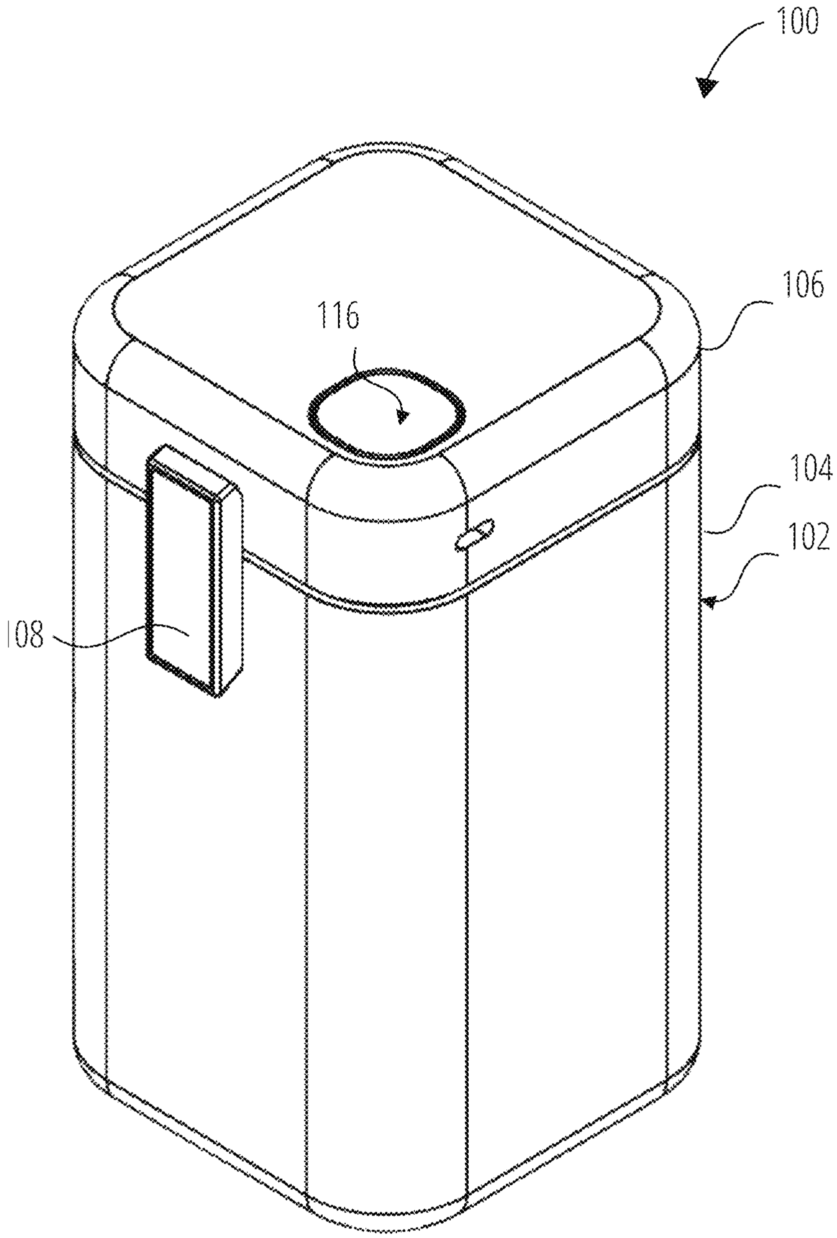
FIG. 1 shows a front upper right perspective view of an embodiment of a bio-specimen refrigeration device according to the present disclosure.

FIG. 1 shows a bio-specimen refrigeration device 100 according to a representative embodiment of the present disclosure, which is operative to rapidly cool a bio-specimen (e.g., a tissue sample) to a temperature of about 0 C or less in 60 seconds or less. The bio-specimens may include solid or liquid tissue biopsies obtained from typical physician or surgical interventions such as a core needle biopsy, bone marrow biopsies, and/or aspirates of tissues or tumor samples. Bio-specimens may also include biofluids, for example blood, cerebrospinal fluid, plasma, serum, or other fluids, as well as cells recovered from such biofluids. Biopsy samples are typically collected and obtained for the diagnosis of diseases, including but not limited to precancerous conditions (suspicious lesions or masses), cancer, cardiovascular diseases, inflammatory diseases or infectious diseases. In any embodiment, the bio-specimen may have a volume of about 1 $cm^3$ or less.

The bio-specimen refrigeration device 100 overcomes current limitations by leveraging chemical and pressurized fluid coolant refrigeration (e.g., aerosol refrigeration). This bio-specimen refrigeration device greatly improves the integrity of patient bio-specimens by enabling rapid freezing in a highly standardized manner in a variety of clinical settings (e.g., intra-operatively, outpatient clinics, radiology suites, field uses such as military applications or in less-developed countries). In some embodiments, the bio-specimens are patient tumor samples. This bio-specimen refrigeration device further enables pharmacodynamic (PD) studies and substantially improves bio-specimen integrity compared with current sub-optimal or impractical workflows, enhancing the reliability of phosphoproteome measurements in clinical and translational research. The bio-specimen refrigeration device improves bio-specimen viability for proteomic diagnostics, enables PD studies, and empowers medical personnel with more precise diagnostic consistency and quality.

As described in detail below, the bio-specimen refrigeration device 100 generally operates by selectively releasing a pressurized fluid coolant from a coolant cartridge into a cooling chamber which encloses a cryovial containing a bio-specimen. The cooling chamber is sized and shaped to carry and be in thermal contact with the cryovial. When the pressurized fluid coolant is released into the cooling chamber, two primary cooling modalities—expansion and evaporation of the fluid coolant—rapidly cool the cooling chamber, the cryovial contained therein, and the bio-specimen contained in the cryovial. The fluid coolant forms a pool around the cryovial. This pool maintains a temperature in the cooling chamber near a boiling point of the fluid coolant (e.g., −28 C), and both surrounding thermal insulation and cooling from evaporation help to sustain this temperature in the cryovial. The pool slowly evaporates, keeping the bio-specimen frozen for an extended period of time (e.g., an hour or more) until the bio-specimen can be removed from the bio-specimen refrigeration device 100 and placed into permanent cold storage.

Figure 2:
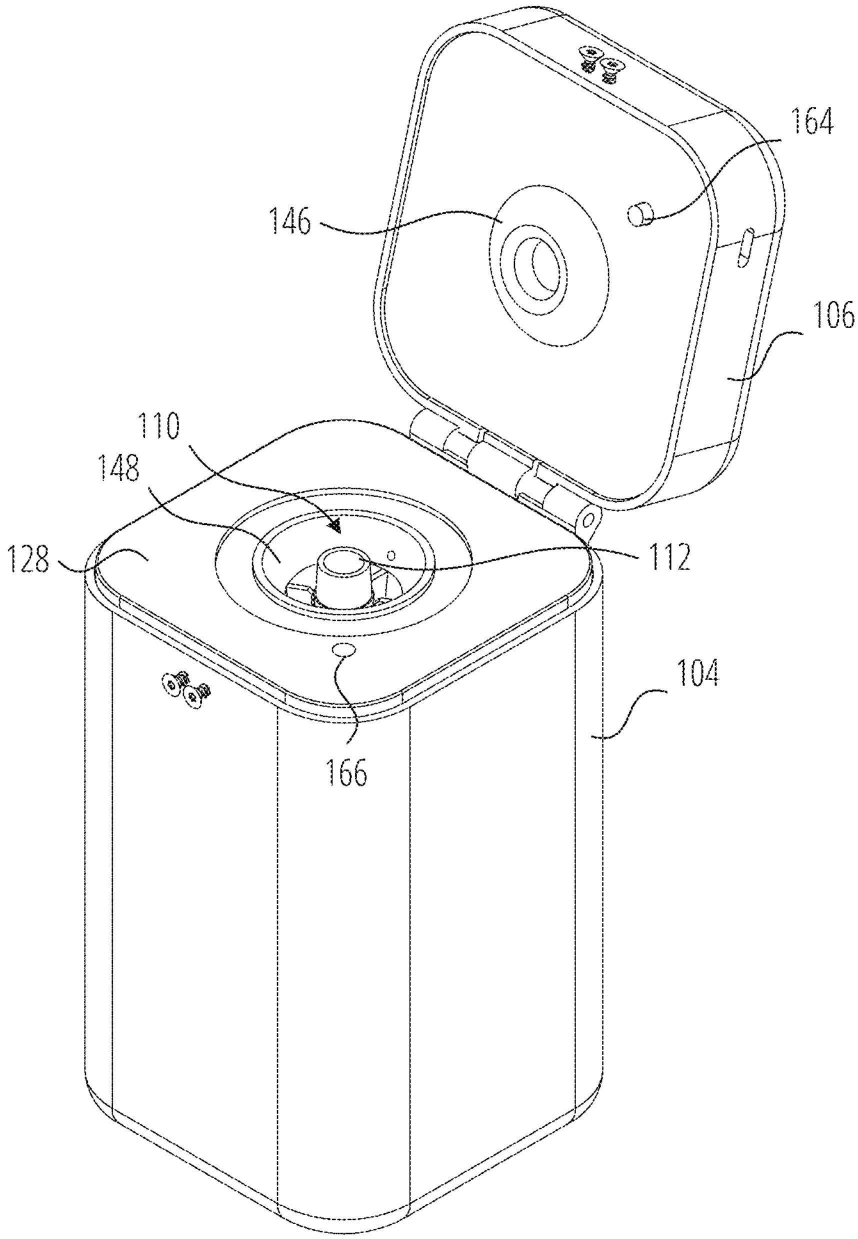
FIG. 2 shows a front upper right perspective view of the bio-specimen refrigeration device of FIG. 1, with a lid in an open position.

As shown, the bio-specimen refrigeration device 100 includes a housing 102 formed at least partially from a polymer (e.g., polypropylene), metal, or other similar material. In some embodiments, the housing is at least partially covered, coated, or treated with a non-rigid material such as a textured polymeric surface coating. The housing 102 includes a base portion 104 and a lid 106 which is selectively moveable between a closed position (FIG. 1) and an open position (FIG. 2). In the closed position, the lid 106 fluidically seals a cooling chamber defined within the base portion 104, as described below. In the open position, the cooling chamber is unsealed and accessible. In the embodiment shown, the lid 106 is attached to the base portion 104 via a hinge and secured in the closed position by a latch 108; however, this is not limiting. In other embodiments, the base portion 104 and lid 106 have a threaded coupling or similar connection means that enables selective and reversible movement between the open position and the closed position.

Turning briefly to FIG. 2, when the lid 106 is in the open position, a cooling chamber 110 defined at least partially by the base portion 104 is accessible. The cooling chamber 110 is sized to receive a cryovial 112, for example a 0.5 mL-5 mL polypropylene or HDPE cryovial. In any embodiment, the cryovial 112 is configured for immersion in liquid phase of liquid nitrogen and/or immersion in the vapor phase of liquid nitrogen. One representative and non-limiting cryovial is Fisherbrand™ threaded cryogenic storage vial, catalog number 10-500-26, available for purchase at https://www.fishersci.com/shop/products/fisherbrand-externally-internally-threaded-cryogenic-storage-vials-10/1050026. The cryovial 112 contains a bio-specimen 114 as described above. As described below, the cooling chamber is fluidically coupled to a coolant cartridge. In use, the coolant cartridge dispenses a fluid coolant into the cooling chamber, which in turn rapidly cools the cooling chamber 110, the cryovial contained therein, and the bio-specimen contained therein.

Returning to FIG. 1, an activation mechanism 116 disposed in the housing 102 is configured to selectively place the coolant cartridge in fluid communication with the cooling chamber 110 via a fluid inlet port and fluid conduit as described below. In the embodiment shown, the activation mechanism 116 is a button disposed in the lid 106; however, this is not limiting.

Figure 3A:
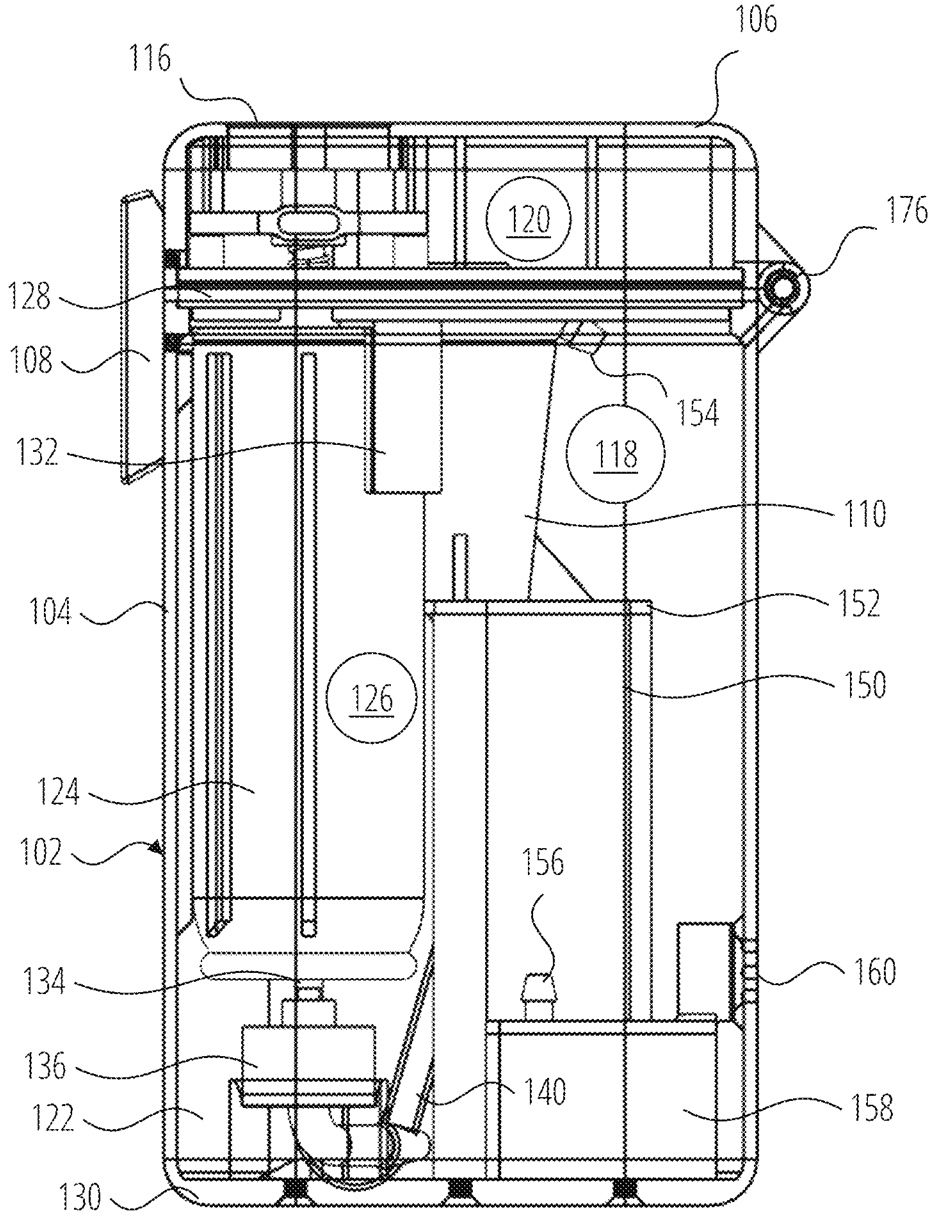
FIG. 3A shows a right side elevation view of the bio-specimen refrigeration device of FIG. 1, with outer surfaces of a housing hidden.
Figure 3B:
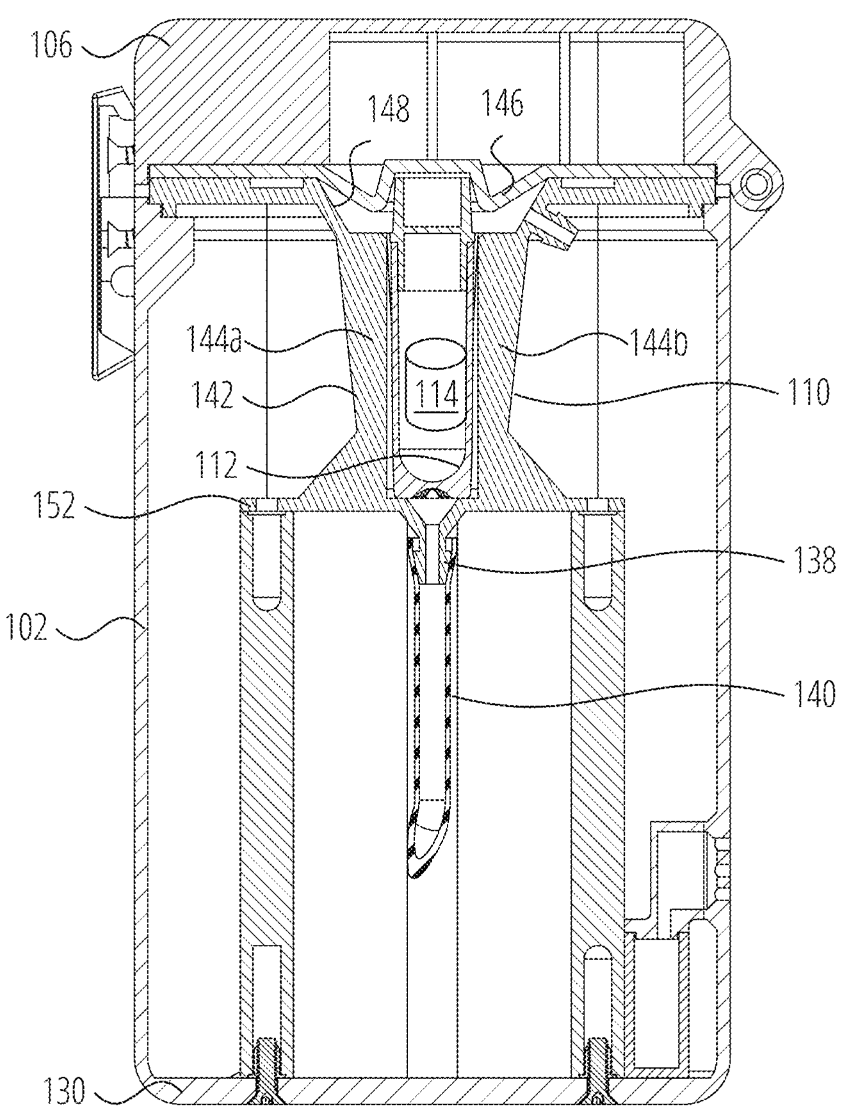
FIG. 3B shows a first right side section elevation view of the bio-specimen refrigeration device of FIG. 1.

Turning now to FIGS. 3A-B, structural details of the bio-specimen refrigeration device 100 will be described.

The base portion 104 of the housing generally defines a hollow interior space containing a number of elements therein, as described below. In any embodiment, the hollow interior space is at least partially filled by a thermally insulating material 118, e.g., polystyrene, in order to better insulate the bio-specimen stored therein. Similarly, in any embodiment, the lid 106 may be at least partially filled with thermally insulating material 120.

A coolant cartridge chamber 122 is an interior space within the housing 102 which is sized to receive a coolant cartridge 124, e.g., a cartridge containing a fluid coolant 126. In the illustrated embodiment, the coolant cartridge chamber 122 is defined as an interior space within the housing 102 which extends (at an upper end) from a cooling chamber skirt 128 to (at a lower end) a bottom housing wall 130. The coolant cartridge chamber 122 is further defined in the illustrated embodiment by an arcuate shroud 132 having a shape complimentary to the coolant cartridge 124, which shroud extends away from a lower surface of a cooling chamber skirt 128. In some embodiments, the cooling chamber 110 is integrally formed with the shroud 132.

The coolant cartridge 124 is a canister storing one or more fluid coolants and configured to dispense the same through an outlet nozzle 134, e.g., when said nozzle is pressed into the coolant cartridge 124. In any embodiment, the fluid coolant has a boiling point less than 0 C at standard temperature and pressure, such as at 1 atmosphere and 273 K. In any embodiment, the fluid coolant is a compressed fluid, such as a compressed gas, compressed liquid, or combination thereof. In any embodiment, the fluid coolant is disposed in an aerosol cannister. In any embodiment, the fluid coolant comprises a compressed coolant selected from the group consisting of carbon dioxide, nitrogen, dimethyl ether, propane, a mixture of dimethyl ether and propane, tetrafluoroethene, butane, and combinations thereof.

In any embodiment, the coolant cartridge 124 is a pressurized aerosol canister storing about 5 g to about 100 g of liquid phase fluid coolant. For example, in any embodiment, the coolant cartridge 124 is a pressurized aerosol canister storing 20-100 g of a liquid mixture of dimethyl ether and propane (e.g., a mixture by weight percent of 15-40% propane and 60-100% dimethyl ether) or carbon dioxide. In other embodiments, the coolant cartridge 124 is a pressurized aerosol canister storing 5-10 g of liquid nitrogen. In still other embodiments, the coolant cartridge 124 stores two or more fluid coolants which, when mixed, create an endothermic cooling reaction (e.g., such as water and ammonium hydroxide).

In some embodiments, the coolant cartridge 124 forms part of the bio-specimen refrigeration device 100. However, in other embodiments, the coolant cartridge 124 is provided separately from the bio-specimen refrigeration device 100.

A fluid inlet port 136 is disposed at or near a bottom end of the coolant cartridge chamber 122, i.e., an end nearest the bottom housing wall 130 of the housing 102. The fluid inlet port 136 receives the outlet nozzle 134 of the coolant cartridge 124 and provides a stationary base against which the outlet nozzle 134 is pushed in order to dispense the pressurized fluid coolant from the coolant cartridge 124. In any embodiment, the fluid inlet port 136 includes a metering valve, throttling plate, or similar restriction configured to throttle or meter the fluid coolant as it is expelled from the coolant cartridge 124. Advantageously, this feature may extend a cooling time for a given amount of fluid coolant. In embodiments in which the fluid coolant generates an endothermic reaction, the two or more components of the endothermic reaction may be mixed in the fluid inlet port 136.

Viewing FIG. 3A and FIG. 3B together, the fluid inlet port 136 fluidically connects the coolant cartridge 124 to an inlet nozzle 138 of a cooling chamber 110 via a conduit 140 (e.g., flexible nylon tubing). The cooling chamber 110 is centrally disposed within the housing 102 and has a cylindrical, frustoconical, or other hollow shape with a central opening sized to receive the cryovial 112 therein. In any embodiment, the base portion 104 of the housing 102 defines a vacuum jacket surrounding the cooling chamber 110 in order to further insulate the same. As described above, thermally insulating material 118 may surround the outer wall 142 of the cooling chamber 110 in order to reduce the rate of heating from the surrounding environment and to help to extend the short-term cold storage time and/or reduce the amount of fluid coolant.

Optional stabilization elements such as ribs 144*a, b* project radially inward from an outer wall 142 of the cooling chamber 110 in order to stabilize the cryovial 112 therein. To this end, a bottom surface of the lid 106 is provided with an annular and recessed crown 146 which sits within a seat 148 of the cooling chamber skirt 128, thereby sealing cooling chamber 110 when the lid 106 is in the closed position. The lid 106 and/or the cooling chamber skirt 128 may be provided with a seal to ensure the lid 106 forms a seal with the cooling chamber 110 in the closed position. In some embodiments, the crown 146 engages a top portion of the cryovial 112 when the lid 106 is in the closed position, thereby immobilizing the cryovial 112 within the cooling chamber 110.

A scaffold 150 supports to the cooling chamber 110 within the interior cavity of the housing 102. In the non-limiting embodiment shown, the scaffold 150 is a rigid C-shaped frame secured at a lower end to the bottom housing wall 130 (e.g., by attachment means including fasteners such as screws) and at an opposite upper end to a lower flange 152 of the cooling chamber 110 (again, by fasteners or other attachment means). In this way, the scaffold 150 secures the lower end of the cooling chamber 110. The cooling chamber skirt 128 is fixedly secured within a mouth of the base portion 104 of the housing 102, thereby securing the upper end of the cooling chamber 110.

The cooling chamber 110 is provided with a cooling chamber excess fluid outlet 154 at an upper end thereof (i.e., an end closest to the lid 106). In use, excess cooling fluid escapes from the cooling chamber 110 through the cooling chamber excess fluid outlet 154, which is fluidically connected by a fluid conduit (e.g., flexible nylon tubing) to an excess cooling fluid chamber inlet port 156 of an excess cooling fluid chamber 158. The excess cooling fluid chamber 158 is a reservoir having an internal volume of about 5 mL to about 100 mL, which is fluidically connected to the environment outside the bio-specimen refrigeration device 100 via an exhaust port 160 through the outer wall 142 of the housing 102.

Figure 4:
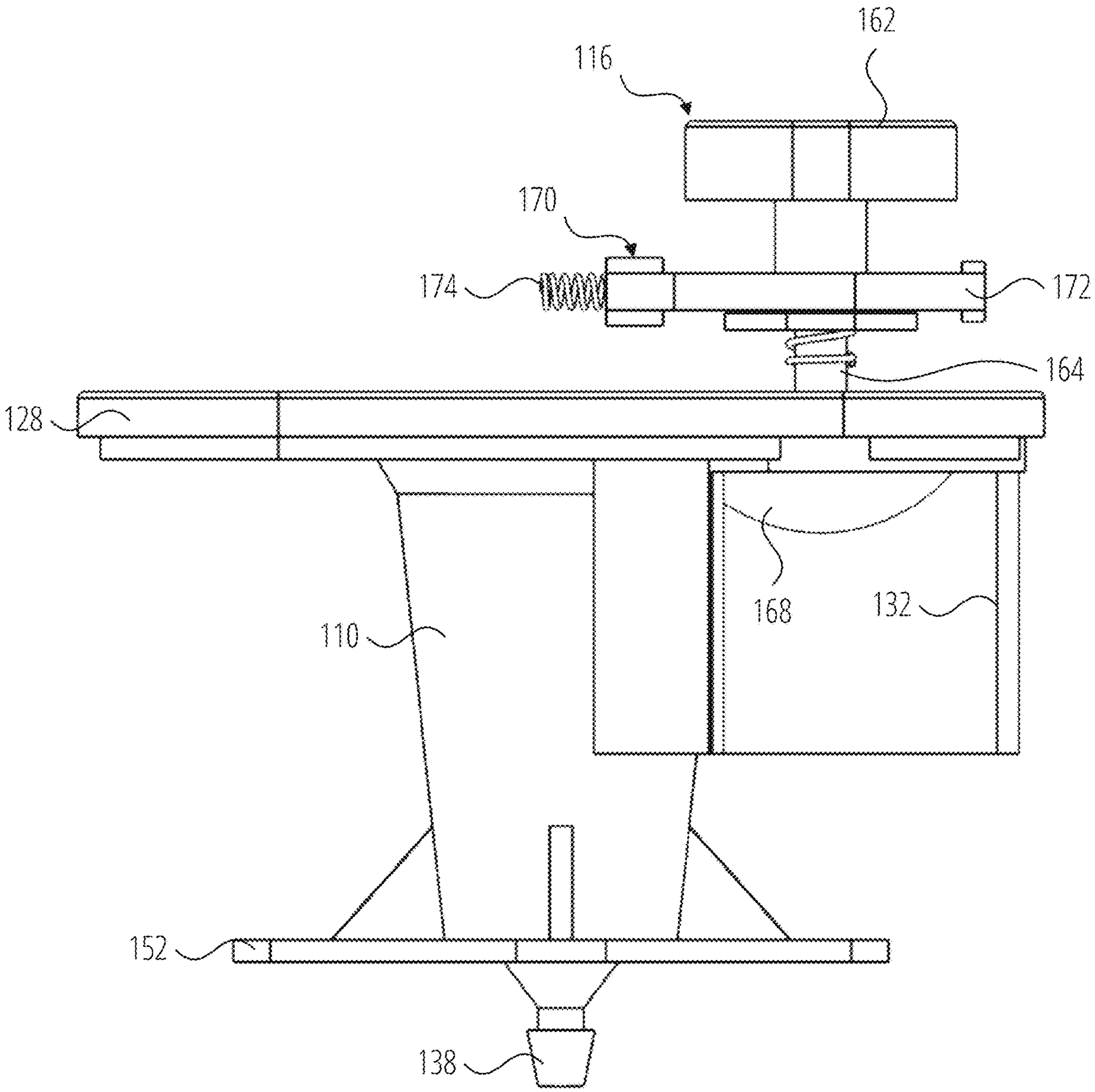
FIG. 4 shows an isometric view of an integral cooling chamber and coolant cartridge chamber of the bio-specimen refrigeration device of FIG. 1.

FIG. 4 shows details of the activation mechanism 116 which is configured to cause the coolant cartridge 124 to dispense fluid coolant into the cooling chamber 110. For simplicity and clarity, a number of elements are hidden from view, including the lid 106 and the base portion 104 of the housing 102.

The activation mechanism 116 includes a member such as a button 162 or similar user input device operably coupled with a plunger 164, which are both disposed in the lid 106 (not shown). The button 162 and plunger 164 are movable between a deactivated position and an activated position. When the button 162 and plunger 164 are moved to the activated position when the lid 106 is in the closed position, a distal end of the plunger 164 protrudes through an aperture 166 disposed through the cooling chamber skirt 128 (see FIG. 2), thereby striking an upper surface of an actuator 168 disposed in an upper end of the coolant cartridge chamber 122. Thus, the activation mechanism 116 pushes the coolant cartridge 124 against the fluid inlet port 136. In this embodiment, the actuator 168 is a convex plate having a shape complementary to an end of the coolant cartridge 124; however, in other embodiments, the actuator 168 may have a different shape.

In the illustrated embodiment, the activation mechanism 116 is configured to actuate the coolant cartridge 124 when the lid 106 is in the closed position, but not otherwise, such that fluid coolant does not escape from the cooling chamber 110. Advantageously, this prevents injury to a user and ensures the cryovial and any bio-specimen carried therein are cooled.

An optional lock 170 is configured to retain the button 162 in the activated position, e.g., to ensure dispensation of all the fluid coolant from the coolant cartridge 124. In particular, the lock 170 includes a slide plate 172 which is biased by a biasing mechanism 174 towards a lock position. The plunger 164 extends through an opening in the slide plate 172. When the plunger 164 is depressed past a certain point (e.g., a point of a reduced diameter of the plunger 164 or other feature), the biasing mechanism 174 causes the slide plate 172 to engage a surface feature of the plunger 164, thereby retaining the plunger 164 and the button 162 in the activated position.

In any embodiment, the lock 170 may be configured to prevent unintentional activation of the activation mechanism 116, for example by preventing depression of the button 162 unless a user first moves the slide plate 172 to an unlocked position.

In any embodiment, a safety seal, for example an adhesive film, may be coupled to the housing or lid in order to prevent unintentional activation of the activation mechanism 116. In any embodiment, the safety seal or interlock covers the button 162, thereby preventing its accidental or premature actuation. In any embodiment, the safety seal is configured to cover the cooling chamber 110. In this regard, the safety seal is configured to isolate the cooling chamber 110 from a surrounding environment and to be selectively removable from the housing 102, thereby mitigating the risk of contamination of the bio-specimen.

In some embodiments, the bio-specimen refrigeration device 100 comprises an active temperature-regulating feature configured to modulate the flow of refrigerant fluid outside the control of a user. In some embodiments, the bio-specimen refrigeration device 100 comprises a temperature indicator configured to indicate when the cooling chamber 110 has an internal temperature at least as cold as a threshold temperature (e.g., 0 C or −8 C). Such temperature indicators may include single-use chemical temperature indicators with a temperature-sensitive medium which undergoes a phase change or property change (e.g., a color change) at or below the threshold temperature. The temperature indicator may have the temperature-sensitive medium disposed in or on the cooling chamber 110. In some embodiments, the temperature indicator includes a visual indicator (e.g., a light emitting diode) portion disposed on the housing 102 which provides a visual indications of when the cooling chamber 110 is below and/or above the threshold temperature. In other embodiments, the housing 102 may have a transparent window therethrough that enables viewing of the temperature-sensitive medium, so a user can determine when the cooling chamber 110 is below and/or above the threshold temperature.

The bio-specimen refrigeration devices of the present disclosure have many advantageous cooling characteristics and capabilities. These include the ability to rapidly freeze a bio-specimen contained in a cryovial disposed in the cooling chamber and maintaining the bio-specimen at a temperature at or below freezing for a time sufficient to place the frozen bio-specimen in a conventional refrigeration device, such as a freezer.

Figure 5:
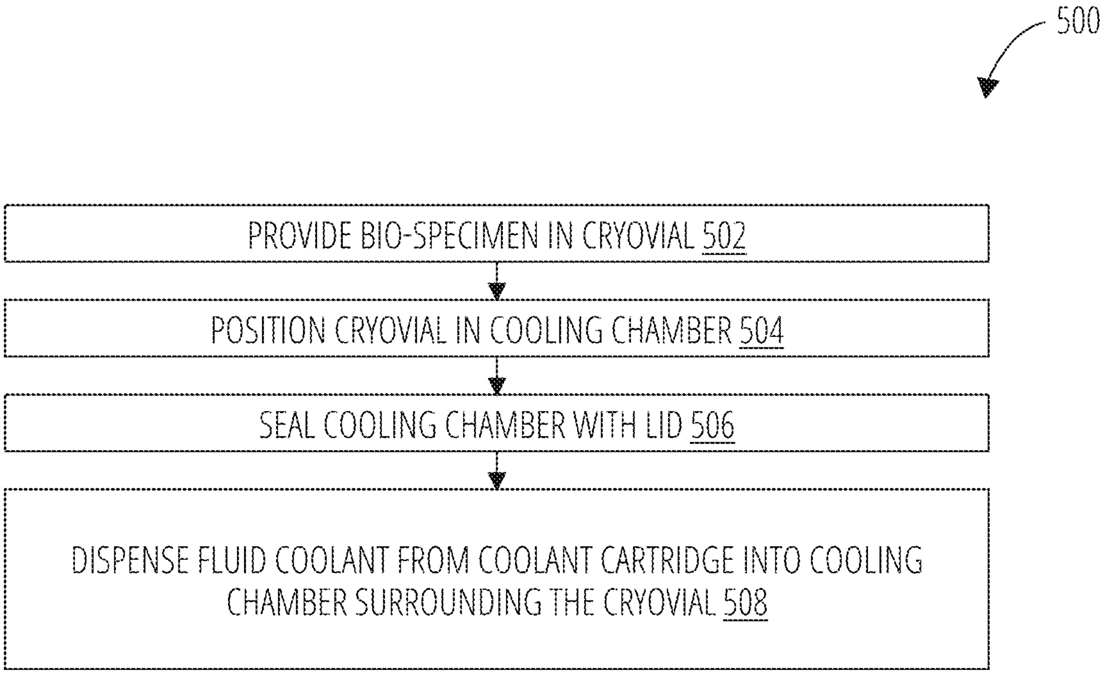
FIG. 5 shows a method of cooling a bio-specimen according to embodiments of the present disclosure.

FIG. 5 provides a representative method 500 of cooling a bio-specimen. In some embodiments, the methods entail cooling the bio-specimen in bio-specimen refrigeration devices such as bio-specimen refrigeration device 100 of FIGS. 1-4. Accordingly, terms used below have alike meanings as alike terms introduced above.

In step 502, a bio-specimen is provided in a cryovial.

In step 504, the cryovial is positioned in a cooling chamber. In some embodiments, the cooling chamber is a cooling chamber of a bio-specimen refrigeration device. Optionally, step 504 includes removing a safety seal from the bio-specimen refrigeration device prior to positioning the cryovial in the cooling chamber.

In step 506, the cooling chamber is sealed with a lid. For example, in some embodiments, the lid is latched, screwed, or otherwise secured in a closed position with a base portion of a housing of a bio-specimen refrigeration device, thereby sealing the cooling chamber.

In step 508, a fluid coolant is dispensed from a coolant cartridge into the cooling chamber surrounding the cooling chamber, thereby cooling the cooling chamber, the cryovial, and/or the bio-specimen to a temperature of about 0 C or less in about 60 seconds or less. The released fluid coolant rapidly cools its surroundings until it can form a pool (1-2 seconds after release). The expansion and evaporation of the pool of fluid coolant cools the outside of the cryovial down to about −32 C, which in turn cools the bio-specimen inside the cryovial. The pool of fluid coolant keeps the bio-specimen cold while it slowly boils off.

In some embodiments, it is advantageous that the fluid coolant pools initially after being dispensed from the coolant cartridge. Accordingly, in an embodiment, the coolant cartridge comprises an amount of fluid coolant sufficient to provide a pool of the fluid coolant in the cooling chamber, such as at atmospheric pressure, when the coolant cartridge is placed in fluid communication with the cooling chamber. To this end, in any embodiment, dispensing the fluid coolant may comprise dispensing an entire contents of the coolant cartridge into the cooling chamber. In some embodiments, the fluid coolant is selected from the group consisting of: carbon dioxide, nitrogen, dimethyl ether, propane, a mixture of dimethyl ether and propane, tetrafluoroethene, butane, and combinations thereof.

Accordingly, in any embodiment, step 508 provides for cooling the cooling chamber, the cryovial and/or the bio-specimen in the cryovial to a temperature of about 0 C in less than about 10 seconds, less than about 20 seconds, less than about 30 seconds, less than about 40 seconds, less than about 50 seconds, less than about 50 seconds, less than about 60 seconds, less than about 70 seconds, or less than about 80 seconds. In any embodiment, step 508 provides for cooling the bio-specimen in the cryovial to a temperature of about 8 C in a range of about 60 seconds to about 240 seconds, in a range of about 100 seconds to about 200 seconds, in a range of about 104 seconds to about 164 seconds; and wherein the bio-specimen refrigeration device is configured to maintain a bio-specimen in the sample container at a temperature of or less than about 0 C for about 80 minutes.

Advantageously, the bio-specimen refrigeration device of the present disclosure enables rapid freezing (to about 0 C within about 1 minute (e.g., 50-70 seconds), −8 C within about 10 minutes (e.g., 9-11 minutes) and short-term cold storage (of greater than 30 minutes at 0 C or lower)) of a biopsy specimen at the point of care.

Figure 6:
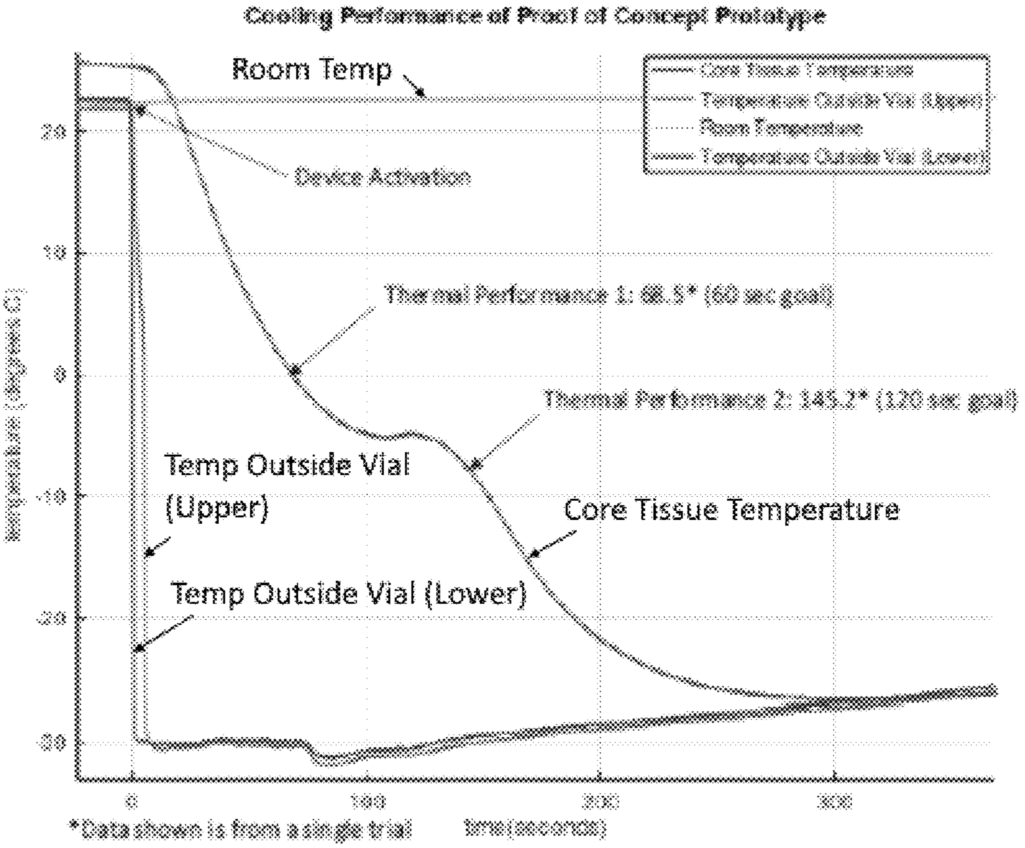
FIG. 6 shows a graph of results from a test of a bio-specimen refrigeration device according to the present disclosure.

Testing of a bio-specimen refrigeration device as described above, using a mixture of dimethyl ether and propane as the fluid coolant with a bio-specimen having a volume of 1 $cm^3$ or less revealed the following test results, as shown in FIG. 6: the core sample temperature of the bio-specimen declined to 0 C at an average of 69.5 seconds (n=3, SD=3.8 seconds); the core sample temperature of the bio-specimen declined to −8 C at an average of 145.2 seconds (n=3, SD=4.5 seconds); and the core sample temperature of the bio-specimen remained below 0 C for about 46.15 minutes (n=3, SD=3.4 minutes).

In the foregoing tests, the tested bio-specimens included core samples harvested from melanoma PDX tumors excised from mice. In particular, ten PDX tumors were harvested and quadrisected. Two parts of the tumor were snap frozen in liquid nitrogen (LN2), and the remaining two parts were rapidly cooled in the bio-specimen refrigeration devices for one hour, providing a replicate for both approaches in each mouse and helping to account for tumor microheterogeneity. Protein lysates were generated for both untargeted (global) LC-MS/MS phosphoprofiling as well as targeted multiple reaction monitoring (MRM) MS-based quantification of a panel of phosphosites that respond to DNA damage.

Global phosphoprofiling of the forty samples derived from the ten PDX tumors was performed across 5 LC-MS/MS experiments, with samples from two tumors profiled in each experiment. Global analysis quantified between 6206-8169 phosphosites per experiment, with 10,848 phosphosites quantified in at least one PDX tumor sample and 3,566 quantified in all of the samples. For these 3,566 phosphosites, measurements had a median variation of 11.6% for the device frozen replicates and 10.4% ($p \leq 2.2$ e−16) for the LN2 frozen replicates. The median absolute difference between the measurements made in device frozen and LN2 frozen samples for these phosphosites was 4% ($p \leq 0.35$). Of the phosphosites that were quantified in every PDX tumor, 8.6% (307) had (FDR<0.05) different levels between tumors frozen in LN2 and those frozen by the bio-specimen refrigeration devices. For these phosphosites, the median variation was 13.7% for device frozen samples and 11.2% for LN2 frozen samples ($p \leq 1.3$ e−7). The absolute difference between the measurements for these phosphosites ranged from 4%-42% (median 14%) ($p \leq 0.0003$), with equal amounts of phosphosite signals higher or lower in bio-specimen refrigeration devices vs liquid nitrogen.

These observations were confirmed by quantifying a subset of radiation-responsive phosphosites using two highly characterized, targeted, MRM-based assay panels incorporating stable isotope-labeled standard peptides to enable analytically robust, precise relative quantification. Twenty-five phosphosites quantified in the global analysis were also quantified by IMAC-MRM. Median variation for the device frozen replicates was 12.2% in the global analysis and 8.3% by IMAC-MRM ($p \leq 0.002$); median variation for the LN2 frozen replicates was 11.6% in the global analysis and 6.2% by IMAC-MRM ($p \leq 6.6$ e−7). The ratios of measurements from device frozen samples to LN2 frozen samples as measured by global analysis and IMAC-MRM had an absolute difference ranging between 1%-15% (median 4%) ($p \leq 0.1$). Three of the 25 phosphosites had (FDR<0.05) different levels in the global analysis between tumors frozen in LN2 and those frozen by the devices; one of these also had different levels as measured by IMAC-MRM. Three of these phosphosites were also quantified by immuno-MRM. Median variation for the device frozen replicates was 10.9% in the global analysis and 14.0% by immuno-MRM ($p \leq 0.4$). Median variation for the LN2 frozen replicates was 9.3% in the global analysis and 13.3% by immuno-MRM ($p \leq 0.4$). The ratios of measurements from device frozen samples to LN2 frozen samples as measured by global analysis and immuno-MRM had an absolute difference ranging between 2%-23% (median 10%) ($p \leq 0.2$). One of the three phosphosites had (FDR<0.05) different levels in the global analysis between tumors frozen in LN2 and those frozen by the devices, but did not have significantly different levels as measured by immuno-MRM.

These results demonstrate that the relative ratios from measurements of the samples frozen by the bio-specimen refrigeration devices and LN2 frozen samples were comparable between global and targeted MS analyses, even though in some instances, these relative ratios were different by one analysis but not the other.

Forty-five phosphosites were quantified in all tumor samples by IMAC-MRM, with median variations of 8.4% and 6.4% for device and LN2 frozen samples ($p \leq 0.005$), respectively, and a median absolute difference of 5% ($p \leq 0.93$). Of those 17.8% (8) had (FDR<0.05) different levels between tumors in LN2 and those frozen by the prototypes, median variations of 13.1% and 6.9% for device and LN2 frozen samples ($p \leq 0.01$), respectively, and absolute differences ranging between 14%-34% (median 19%) ($p \leq 0.96$). Sixteen phosphosites were quantified by immuno-MRM, with median variations of 14.7% and 13.3% for device and LN2 frozen samples ($p \leq 0.13$), respectively, and a median absolute difference of 10% ($p \leq 0.74$). Of those, 6.7% (1) had (FDR<0.05) different levels, a median variation of 18.1% and 19.1% for device and LN2 frozen samples, respectively, and an absolute difference of 18%. These results demonstrate that the majority of the phosphoproteome shows no difference in tissue samples frozen by bio-specimen refrigeration devices of the present disclosure and snap-frozen by liquid nitrogen.

Reference throughout this specification to "an embodiment" or "some embodiments" means that a particular feature, structure, or characteristic described in connection with the embodiment is included in at least one embodiment of the present invention. Thus, the appearances of the phrases "In some embodiments" or "in an embodiment" in various places throughout this specification are not necessarily all referring to the same example. Furthermore, any particular features, structures, and/or characteristics of any embodiments may be combined in any suitable manner in one or more examples.

Spatially relative terms, such as "beneath," "below," "bottom," "top," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly.

This disclosure refers to a number of terms with respect to different embodiments (including apparatuses and methods). Terms having alike names have alike meanings with respect to different embodiments, except where expressly noted. Similarly, this disclosure utilizes a number of terms of art. These terms are to take on their ordinary meaning in the art from which they come, unless specifically defined herein or the context of their use would clearly suggest otherwise.

The present application may also reference quantities and numbers. Unless specifically stated, such quantities and numbers are not to be considered restrictive, but representative of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

What is claimed is:

1. A bio-specimen refrigeration device, comprising:

a housing comprising a lid selectively moveable between an open position and a closed position;

a coolant cartridge chamber disposed in the housing and comprising a fluid inlet port configured to fluidically couple with a coolant cartridge disposed in the coolant cartridge chamber;

a cooling chamber disposed in the housing and configured to receive a fluid coolant from the coolant cartridge, wherein the fluid inlet port comprises a restriction configured to meter the fluid coolant as it is expelled from the coolant cartridge, and wherein in the closed position, the lid seals the cooling chamber; and an activation mechanism configured to selectively place the coolant cartridge in fluid communication with the fluid inlet port by pushing on an end of the coolant cartridge, wherein the activation mechanism comprises a member disposed in the lid and movable from a deactivated position to an activated position, wherein the member is operably coupled with a plunger configured to push an actuator against the coolant cartridge when the lid is in the closed position and the member is moved to the activated position, wherein the activation mechanism comprises a lock that retains the member in the activated position.

2. The bio-specimen refrigeration device of claim 1, wherein the cooling chamber has a cylindrical or frustoconical recess formed therein.

3. The bio-specimen refrigeration device of claim 2, wherein a plurality of stabilization elements extend radially inward from an outer wall of the cylindrical or frustoconical recess.

4. The bio-specimen refrigeration device of claim 2, wherein a skirt extends radially away from the cylindrical or frustoconical recess, wherein the skirt engages the housing.

5. The bio-specimen refrigeration device of claim 1, wherein the lid forms a seal with the cooling chamber in the closed position.

6. The bio-specimen refrigeration device of claim 5, wherein a bottom surface of the lid is provided with a crown configured to sit within a seat of the cooling chamber.

7. The bio-specimen refrigeration device of claim 1, wherein the fluid inlet port fluidically connects with an inlet nozzle of the cooling chamber.

8. The bio-specimen refrigeration device of claim 1, further comprising a thermally insulating material disposed within the housing around the cooling chamber.

9. The bio-specimen refrigeration device of claim 1, further comprising a latch configured to lock the lid in the closed position.

10. The bio-specimen refrigeration device of claim 1, further comprising the coolant cartridge disposed in the coolant cartridge chamber.

11. The bio-specimen refrigeration device of claim 10, wherein the coolant cartridge contains 5 mL-100 mL of the fluid coolant, wherein the fluid coolant is selected from the group consisting of: carbon dioxide, nitrogen, dimethyl ether, propane, a mixture of dimethyl ether and propane, tetrafluoroethene, and butane.

12. The bio-specimen refrigeration device of claim 1, further comprising a cryovial configured to be received within the cooling chamber.

13. The bio-specimen refrigeration device of claim 1, further comprising an excess cooling fluid chamber in fluid communication with the cooling chamber and disposed at an end of the housing.

14. The bio-specimen refrigeration device of claim 13, wherein the excess cooling fluid chamber comprises an exhaust port through an outer wall of the housing.

* * * * *